INVENTORS
Jean A. Valembois &
Jean-Marie Couvreur

BY Spencer & Kaye
ATTORNEYS

| A(I) | L | ℓ | C. V. |
|---|---|---|---|
| 2 | 1590 | 1440 | 229 |
| 3 | 1560 | 1440 | 225 |
| 2 | 2070 | 1480 | 224 |
| 2 | 1590 | 1410 | 224 |
| 2 | 2100 | 1450 | 221 |
| 4 | 2040 | 1480 | 220 |
| 2 | 1560 | 1410 | 220 |
| ⋮ | ⋮ | ⋮ | ⋮ |

Fig. 4a.

| A(I) | L | ℓ | C. V. | n |
|---|---|---|---|---|
| 2 | 1590 | 1440 | 229 | 1 ↓ |
| 3 | 1560 | 1440 | 225 | |
| 2 | 1590 | 1410 | 224 | |
| 2 | 1560 | 1410 | 220 | |
| ⋮ | ⋮ | ⋮ | ⋮ | |
| 2 | 2070 | 1480 | 224 | 2 ↓ |
| 2 | 2100 | 1450 | 221 | |
| 4 | 2040 | 1480 | 220 | |
| ⋮ | ⋮ | ⋮ | ⋮ | |

Fig. 4b.

INVENTORS
Jean A. Valembois &
Jean-Marie Couvreur
BY Spencer & Kaye
ATTORNEYS

INVENTORS
Jean A. Valembois &
Jean-Marie Couvreur
BY Spencer & Kaye
ATTORNEYS

INVENTORS
Jean A. Valembois &
Jean-Marie Couvreur
BY Spencer & Kaye
ATTORNEYS

INVENTORS
Jean A. Valembois &
Jean-Marie Couvreur
BY Spencer & Kaye
ATTORNEYS

INVENTORS
Jean A. Valembois &
Jean-Marie Couvreur
BY Spencer & Kaye
ATTORNEYS

INVENTORS
Jean A. Valembois &
Jean-Marie Couvreur

BY Spencer & Kaye
ATTORNEYS

INVENTORS
Jean A. Valembois &
Jean-Marie Couvreur
BY Spencer & Kaye
ATTORNEYS

INVENTORS
Jean A. Valembois &
Jean-Marie Couvreur
BY Spencer & Kaye
ATTORNEYS

March 31, 1970 JEAN-ADOLPHE VALEMBOIS ET AL 3,503,290

METHOD FOR CUTTING A SHEET OR STRIP INTO A PLURALITY OF PIECES

Filed Dec. 8, 1967 12 Sheets-Sheet 10

INVENTORS
Jean A. Valembois &
Jean-Marie Couvreur

BY Spencer & Kaye
ATTORNEYS

March 31, 1970 JEAN-ADOLPHE VALEMBOIS ET AL 3,503,290
METHOD FOR CUTTING A SHEET OR STRIP INTO
A PLURALITY OF PIECES
Filed Dec. 8, 1967 12 Sheets-Sheet 11

INVENTORS
Jean A.Valembois &
Jean-Marie Couvreur
BY Spencer & Kaye
ATTORNEYS

March 31, 1970 JEAN-ADOLPHE VALEMBOIS ET AL 3,503,290

METHOD FOR CUTTING A SHEET OR STRIP INTO A PLURALITY OF PIECES

Filed Dec. 8, 1967 12 Sheets-Sheet 12

INVENTORS
Jean Valembois &
Jean-Marie Couvreur

BY Spencer & Kaye
ATTORNEYS

United States Patent Office 3,503,290
Patented Mar. 31, 1970

3,503,290
METHOD FOR CUTTING A SHEET OR STRIP INTO A PLURALITY OF PIECES

Jean-Adolphe Valembois, Woluwe-St. Lambert, and Jean-Marie Couvreur, Moustier-sur-Sambre, Belgium, assignors to Glaverbel, Watermael-Boitsfort, Belgium Filed Dec. 8, 1967, Ser. No. 689,126
Claims priority, application Luxembourg, Dec. 13, 1966, 52,594
Int. Cl. B26d 1/00
U.S. Cl. 83—23 8 Claims

ABSTRACT OF THE DISCLOSURE

A method for cutting sheets or strips of material into a number of pieces of predetermined dimensions listed in an order book, by detecting the coordinates of any flaws present in each sheet or strip, allocating to each piece of predetermined dimensions to be produced a numerical value representing the cost price of the piece, establishing sheet or strip cutting patterns taking account of the flaws present, by developing various arrangements on the strip or sheet of the pieces of predetermined dimensions taken from at least a part of the order book, selecting and retaining that cutting pattern for which the ratio between the sum of the numerical values representing the cost prices of the pieces appearing in the pattern and the total sheet or strip area utilized is a maximum, and cutting the sheet or strip in accordance with at least a part of the selected cutting pattern.

Background of the invention

This invention relates to a method for cutting material in sheet, strip or ribbon form into a number of pieces whose dimensions are predetermined by the data contained in an order book. The term "order book" is here intended to mean any compilation of the number and dimensions of the various pieces which must be produced.

In many industries, the material from which the finished product is to be obtained is manufactured in the form of a continuous strip or ribbon after one or more consecutive processing operations, this being true, for example, in metallurgy, for the production of sheet metal, in the glass-making industry and in the plastics and paper-making industries. The resulting strip or ribbon is then cut into a number of pieces, or articles, which have various dimensions, the various sizes in fact constituting the items of an order book which is the product of the centralization of a number of orders from customers. Such pieces are the actual finished product of the particular producing industry or organization.

As a rule, the continuous strip or ribbon is systematically cut up into sheets all having the same dimensions, simply by cutting the sheet at right angles to its direction of travel as the sheet advances, whereafter the sheets are removed to a subsequent treatment station where they are cut up into pieces of various sizes as specified in the order book. Cutting is undertaken by a team of several workers. Each worker is assigned to selected ones of the pieces included in the order book and must produce his assigned pieces while making optimum use of the sheets and while taking into account any flaws present therein.

The criterion utilized to judge whether the sheets have been well exploited as that of the optimum utilization of the area of the sheets. Such a criterion usually leads to cutting out pieces having small and medium formats before cutting out the large format pieces.

In order to diminish this drawback, it was necessary to impose a restriction. This generally consists in firstly placing upon the sheet to be cut out a piece having the largest possible area and in filling the remaining parts of the sheet with pieces of smaller dimensions. The plans, schemes or patterns, in accordance with which the sheets are cut out, are then practically always of the same type.

This restriction on optimum planning of the cutting out of sheets or a strip has certain drawbacks. In fact, this type of optimization does not in any way take into account the overall composition of the order book, that is to say, the proportion between the large and small formats present in the order book.

When the order book comprises a large number of large formats and a few small formats, it is a fact that with the imposed criterion the small formats will not be cut out rapidly in view of the priority given to large formats. Although it will be possible to obtain a suitable cutting efficiency from the point of view of the utilization of the surface area, from the point of view of delay in cutting out the small formats the situation can become difficult.

The situation becomes still more difficult when account is taken of the evolution of the order book, i.e., the change in order book composition as old orders are filled and new ones received. In this case, the order book is constantly supplied pieces in new formats, both large and small. It results that certain small formats will be cut out only after relatively long delays, i.e., after having been listed in the order book for relatively long periods of time.

Summary of the invention

It is a primary object of the present invention to substantially minimize or eliminate these drawbacks and difficulties.

Another object of the present invention is to compensate for undue delays in the cutting of pieces having various formats.

Yet another object of the present invention is to conform the manner of selecting formats to be cut to existing needs.

Still another object of the present invention is to determine cutting patterns in accordance with limitations on the capabilities of loading facilities disposed at the output of the cutting station.

To achieve these objects, the present invention employs a criterion for determining cutting patterns which is substantially different from criteria previously employed and which is equally applicable to the cutting of sheets or strips.

These and other objects according to the present invention are achieved by the provision of a method for cutting sheets or strips of material into a number of pieces of predetermined dimensions listed in an order book, which method includes the steps of:

Detecting the coordinates of any flaws present in each sheet or strip;

Allocating to each piece of predetermined dimensions to be produced a numerical value representing the cost price of the piece;

Establishing sheet or strip cutting patterns taking account of the flaws present, by developing various arrangements on the strip or sheet of the pieces of predetermined dimensions taken from at least a part of the order book;

Selecting and retaining that cutting pattern for which the ratio between the sum of the numerical values representing the cost prices of the pieces appearing in the pattern and the total sheet or strip area utilized is a maximum; and Cutting the sheet or strip in accordance with at least a part of the selected cutting pattern.

When the criterion of optimum planning of the cutting-out is based upon values representing the cost prices of the pieces, the advantage is obtained that optimum planning is effected from the standpoint of economic efficiency, or yield.

As will appear hereinafter, this criterion of economic yield readily permits the composition and evolution in time of the order book, as well as various other important restrictions, to be taken into account.

The establishment of the cutting-out plans, or patterns, can be effected according to any logic, and preferably by the use of a computer, so as to obtain a large number of plans, including that which presents the best economic yield.

In the particular case where the establishment of cutting plans is envisaged for sheets, and always for the total area of each sheet, it will be sufficient to select the cutting plan for which the sum of the numerical values representing the cost prices of the pieces included in the plan is a maximum, the total utilized area being the same for each plan and being equal to the area of the sheet to be cut out.

As regards the numerical value representing the cost price to be attributed to a piece, this is preferably determined on the basis of the marginal cost price of a selected piece of analogous dimensions.

According to an interesting variant, when sufficient data on the marginal cost price is not available, the numerical value representing the cost price to be attributed to a piece can be determined by the formula $(n(S^{1+\epsilon})+A)$, where S represents the area of the piece, $\epsilon$ is a factor which is a function of the geometric yield of the cutting operation, $n$ the cost price of a piece of unit area, and A a constant the value of which depends upon the cutting conditions. It should be appreciated that any known approximation can be utilized for the term $S^{1+\epsilon}$, such, for example, as $(S+\alpha S^2)$. In this particular case it is the coefficient $\alpha$ which performs the function of the factor $\epsilon$.

The numerical value can be modified at any time to take into account variations in the marginal cost price. These variations are subject to external contingencies.

In particular, the numerical value representing the cost price can be modified as a function of the degree of urgency with which the piece is to be cut out, an increase in the degree of urgency involving an increase in the numerical value representing the cost price, so that it is possible to compensate for certain delays which might otherwise occur, for example, in the delivery of pieces which normally are allocated a low value representing their cost price.

The numerical value representing the cost prices can also be modified as a function of the variation in time of the distribution of the format sizes present in the order book.

According to another possible manner of carrying out the method according to the present invention, the numerical value representing the cost price can be modified as a function of the variation in the density, or concentration, of flaws present in the sheets or strip to be cut up, an increase in this density leading to an increase in the numerical value attributed to large formats and a decrease in the numerical value attributed to small formats.

The numerical value representing the cost price is preferably a function of the relative desirability of each piece to be obtained, high values being allocated to more desirable pieces.

According to yet a further advantageous possible manner of carrying out the method according to the invention, the numerical values representing the cost prices of pieces constituting sub-units being processed are modified as a function of the state of relative advancement of lines of such sub-units, which lines together constitute a group, the values attributed to the pieces appearing in the lines in arrears being increased in relation to the values of the pieces appearing in the lines in advance. For example, the sub-units could consist of containers in which the pieces are to be loaded after cutting, the containers being in lines and only that container at the head of each line being supplied with pieces at any given time.

Brief description of the drawings

FIGURES 4*a* and 4*b* show two ways of classifying pieces having predetermined dimensions in an order book.

Description of the preferred embodiments

The description given hereinafter is directed to the use of the process of the invention in cutting sheets, or a continuous strip, or ribbon of glass. The process can of course be used similarly for other materials in sheet, strip, or ribbon form, including sheet metal, paper, plastics, timber and so on.

Figure 1:
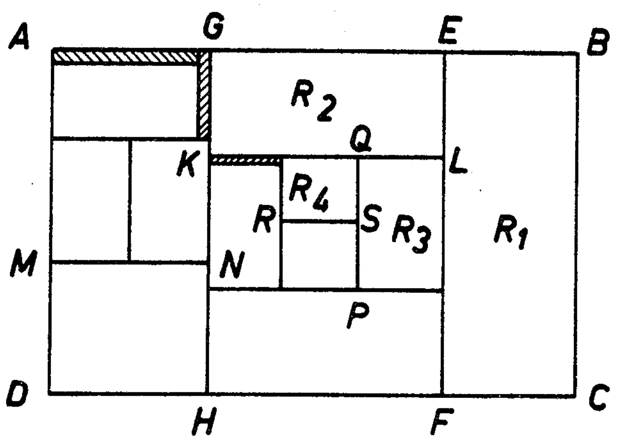
FIGURE 1 is a pictorial view of part of a cutting pattern for a sheet used for explaining the present invention.

A description will first be given, with reference to FIGURE 1, of the concept of the rank of a cut as used in devising the schemes, or patterns, of the present invention, and the concept of the rank of a piece or panel resulting from such a cut. Rectangle ABCD represents a sheet of glass which is to be cut into a number of pieces whose dimensions are predetermined by the entries in an order book. Part of a cutting pattern has already been prepared on the rectangle by the placement of a number of lines defining smaller rectangles, along which lines the sheet will be cut once the complete pattern has been established. The rectangles $R_1$, $R_2$, $R_3$ and $R_4$ define portions of the sheet parts for which no cutting pattern has as yet been devised, and the other rectangles, except for the cross-hatched rectangles correspond to pieces which will meet the requirements of the order book. The hatched rectangles represent unusable items which in the case of glass will be treated as cullet, or scrap.

Rectangle $R_1$ can be removed from the glass sheet by a single cut along line EF which extends from one edge of the sheet to the other. The line EF represents a first-rank, first-order or primary cut, and the rectangle $R_1$ obtained by such cut is a primary or first-rank, or first-order piece or panel. A first-rank cut is necessary for removing the rectangle $R_1$ from the original sheet. The line GH represents another cut of the first-rank, or rank 1, enabling two other primary panels AGHD and GEFH to be removed.

To remove the rectangle $R_2$ from the glass sheet, a further cut must be made along line KL between two first-rank cuts. The cut along KL is a second-rank, second-order, or secondary cut and when such a cut is required to remove a piece, such as piece $R_2$, that piece is referred to as a second-rank, second-order, or secondary piece or panel. A second-rank cut can also extend between a first-rank cut and an edge of the sheet, as it is represented by the line MN. Similarly, to remove the rectangle $R_3$ from the sheet, another second-rank cut through point P must be made, followed by a third-rank cut PQ. To then remove piece $R_4$, it is necessary to make another third-rank cut through point R, and then a fourth-rank cut RS must be made.

Thus, a cut of any particular rank always extends between two cuts of an immediately preceding rank, or between an edge of the sheet and one cut of such immediately preceding rank. Also, even-rank (i.e., ranks 2, 4, 6, etc.) cuts are parallel to one another and perpendicular to odd-rank (i.e. ranks 1, 3, 5, etc.) cuts. Finally, cuts are made in order of increasing rank number.

Figure 2A:
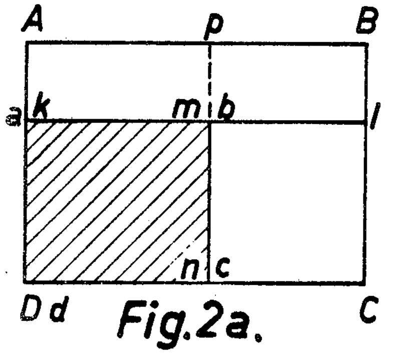
FIGURES 2*a* and 2*b* are pictorial representations of two possible ways of cutting out a given piece.

In the development of various cutting schemes, or patterns two cuts of consecutive ranks usually have to be selected for each piece from amongst the various cutting possibilities for the piece concerned. Basically, there are four possible ways of cutting a piece placed in a given corner of a rectangular sheet to be used and these ways are shown in FIGURES 2*a* and 2*b*.

According to a first way, a piece *abcd* which is to be cut out is located in a corner of the sheet, for instance, the corner D, with its long side *cd* extending along the long side CD of the sheet. The piece can then be removed from the sheet by a cut *kl*, followed by a cut *mn*.

According to a second way, the piece is positioned similarly but is removed by a cut *pn* followed by a cut *km*.

Figure 2B:
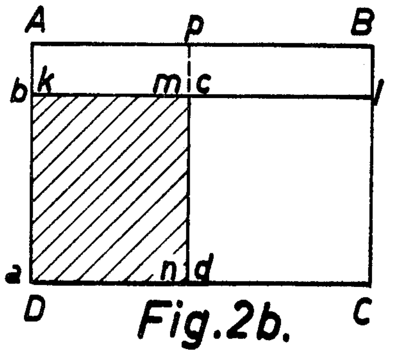

The two other ways are obtained similarly by the same cuts, except that, as is shown in FIGURE 2*b*, the piece *abcd* is placed in the same corner D of the sheet but with its narrow side *ad* extending along the long edge, or side, CD of the sheet.

If the long side *cd* of the piece is longer than the narrow side DA of the sheet to be cut, the number of possible ways of cutting out the piece is reduced to two. The choice between the ways of cutting must be made not only with regard to cutting a first piece from the sheet of glass, as is shown in FIGURES 2*a* and 2*b*, but also for cutting a piece of any rank from an area to be utilized. For instance, this selection must be made with respect to any piece to be removed from the rectangle $R_4$ in FIGURE 1. The number of possible ways of cutting out a piece becomes greater than four when the piece to be cut is not required to be placed at a corner.

Although the primary cuts could conceivably be made in either of the two possible directions, i.e., either perpendicular to the long side AB of the sheet or perpendicular to the narrow side BC thereof, the convention will be adopted hereinafter that the primary cuts are always made perpendicular to the long edge of the sheet. Consequently, all the odd-rank cuts will be perpendicular to the long edge or side of the sheet and all the even-rank cuts will be perpendicular to the narrow side of the sheet.

As a result of adopting this convention, for instance, in the case of FIGURE 2*a* the piece *abcd* is, according to one cutting procedure, removed from the sheet ABCD by a primary cut *pn* and by a secondary cut *km*. According to the alternate cutting procedure, *kl* is considered as a secondary cut and *mn* represents a tertiary, or third-rank cut. The primary cut which must in theory precede these two cuts is assumed to coincide with the sheet edge BC.

Another choice which must be made when devising the various cutting schemes is between the various ways of orienting, upon the area to be utilized, the format of the piece to be cut out. This can take into account any flaws which may be present in such area.

Figure 3:
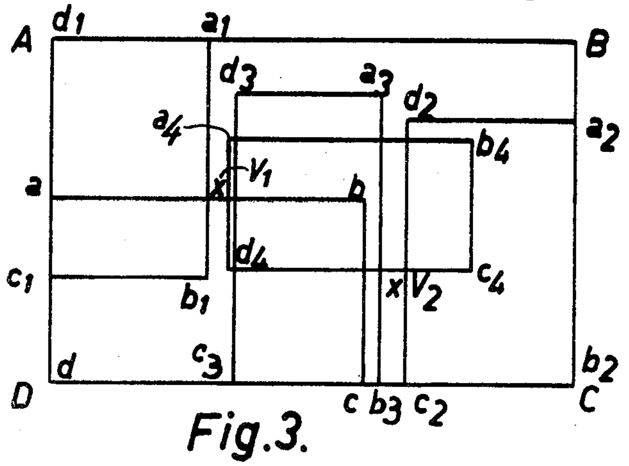
FIGURE 3 is a pictorial representation of possible ways of placing an article in the case of a sheet containing flaws for further explaining the present invention.

Referring now to FIGURE 3, it will be assumed that the area to be utilized is again the sheet ABCD. The same has, for example, two flaws $V_1$ and $V_2$ which are assumed to be point-like and which cannot be present in the resulting pieces because this would cause the pieces to be rejected. A first possible placing of a piece to be cut is represented by the rectangle *abcd*, whose dimensions correspond to a piece listed in the order book. This piece does not contain either of the flaws $V_1$ and $V_2$. Another possible way of positioning a piece, whose dimensions are not necessarily identical to those of the rectangle *abcd*, is shown by the rectangle $a_1b_1c_1d_1$. Other possibilities are represented by the rectangles $a_2b_2c_2d_2$ and $a_3b_3c_3d_3$, and a further possible way of placing the piece is represented by the rectangle $a_4b_4c_4d_4$. In this last possible position, the piece is placed in the middle of the sheet right next to the two flaws $V_1$ and $V_2$.

As these few necessarily limited examples show, there are many passible ways of locating a piece in a flawed sheet. In practice, however, the possibilities are limited, for instance, by imposing the restriction that the piece be placed in one of the corners of the sheet, or between the flaws but in contact with one sheet edge as exemplified by rectangle $a_3b_3c_3d_3$ in FIGURE 3.

In the case where a first piece must be positioned on a continuous strip or ribbon, a possible restriction that can be imposed is that the pieces must be placed in the corners of the strip or ribbon or, if it is required to place the pieces between the flaws, the restriction may be imposed that one of the sides of the first piece must be disposed along the front, or leading, edge of the strip or ribbon.

As FIGURES 2 and 3 show, the choice of a manner of cutting and of a manner of positioning have a considerable effect on the subsequent cutting possibilities available, and so all of the possible combinations for each piech between the ways of cutting and the possible ways of placing it must be considered in the development of the patterns for dividing a sheet or strip. The only feasible way of doing this in practice is by using a computer.

To facilitate understanding, consideration will be given hereinafter only to a single manner of cutting and to a single manner of placing for each piece making up a cutting pattern. These modes may differ from one piece to the next in the same scheme, or pattern.

A first non-limiting example to be given below of the development of an optimum cutting scheme relates to the cutting of a sheet having predetermined dimensions.

Actually, and as has already been stated herein, the procedure for devising schemes as will be described hereinafter forms a logic base according to which a computer can be programmed to derive the various possible schemes.

During the making of the finished product and at any given time there exists an order book consisting of a particular number of items to be made. A numerical value representing the first cost or cost price, is allotted, in a manner to be described hereinafter, to each item in the order book. Associated with this order book are a number of sheets, either of the same dimensions or of different dimensions, from which the pieces representing the order book contents are to be produced.

The order book pieces are then classified in decreasing order of their cost-representing numerical values, as shown in an example in FIGURE 4*a*, where column A(I) indicates the number of pieces of each size to be cut, the length and width dimensions of the pieces being given in the columns L and 1, respectively. The column C.V. indicates the numerical cost value allotted to each piece. The order book thus arranged is examined line by line for developing the possible cutting schemes.

An alternative way of classifying the order book items is illustrated in FIGURE 4*b*. The items are grouped into handling units—in this particular case by containers—and the container groups are arranged in decreasing order of the mean, or average, of the cost-representing numerical values of the pieces intended for each container. The column headings have the same meaning as for FIGURE 4*a* and the column *n* indicates the identification number assigned to the particular container. As FIGURE 4*b* shows, the articles intended for any single container have very similar dimensions.

As the cutting schemes are varied during the search for the best scheme, it can be seen that, if the item of the first line of container No. 1 is replaced by the item of the second line of such container, there is a very great probability that the new scheme will be very similar to the immediately preceding scheme, something which is not particularly useful. Conveniently, therefore, scanning of the order book can proceed immediately to the first line of container No. 2 without scanning all the lines corresponding to the first container.

The pieces for container No. 2, although of larger dimensions than the pieces for container No. 1, may possibly be suitable for devising the new scheme, since the pieces of the container No. 2 are of lower quality than those of container No. 1 and can possess some flaws which are not allowable for the pieces of container No. 1. This is why the numerical values allotted to the pieces of container No. 2 are close to the numerical values allotted to the pieces of container No. 1 despite the larger dimensions of the former pieces in proportion to their values, as will be described hereinafter.

In the development of a cutting scheme for a sheet, any flaws in the sheet are first detected. For example, in the case of the sheet ABCD shown in FIGURE 5*a*, the flaws $V_1$, $V_2$ and $V_3$ will first be located.

These flaws can be detected, and their coordinates relative to two sheet edges at right-angles to one another can be determined, either by simple visual inspection or or by automatic sensing devices such as photoelectric cells. Each flaw has allotted to it, in addition to position coordinates, a value representing its importance as regards its effect on finished product quality. In this system the flaws can be classified in a number of categories. For instance, in the example shown in FIGURE 5*a*, the flaws $V_1$ and $V_2$ are considered unacceptable for the quality of the particular pieces concerned, whereas flaw $V_3$ is considered acceptable. In other words, certain types, or degrees, of flaws are allowable in the end products.

For example, certain flaws would be acceptable in finished pieces intended for use in the horticulture field as the windows of greenhouses, whereas the same flaws would not be acceptable in finished pieces destined for use in mirrors. As a general rule, an order book will contain several categories of pieces having different requirements as regards the quality which they are to have.

After the flaws have been located and their nature determined, the classified order book is scanned line by line and a first piece is located on the sheet to be cut. In actual fact, the operation is not physically carried out at this time but it is simply described in this manner to facilitate the explanation of the logical procedure for devising the schemes. Similar considerations apply throughout the remainder of the present description. This first piece has the highest cost-representing value and has dimensions which are compatible with the flaws.

Figure 5A:
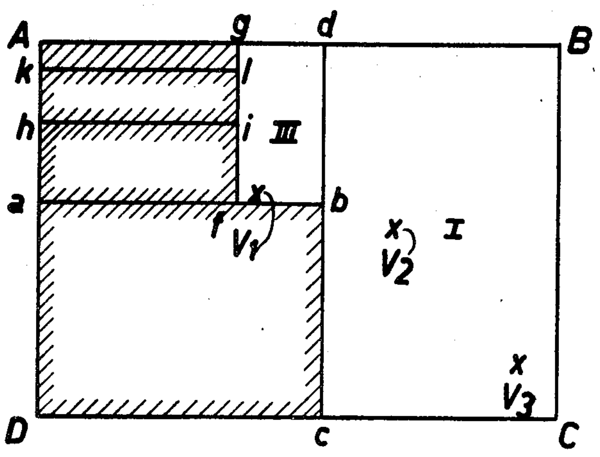
FIGURES 5*a*, 5*b* and 5*c* are pictorial views showing three steps in the development of a cutting pattern for a sheet according to the present invention.
Figure 5B:
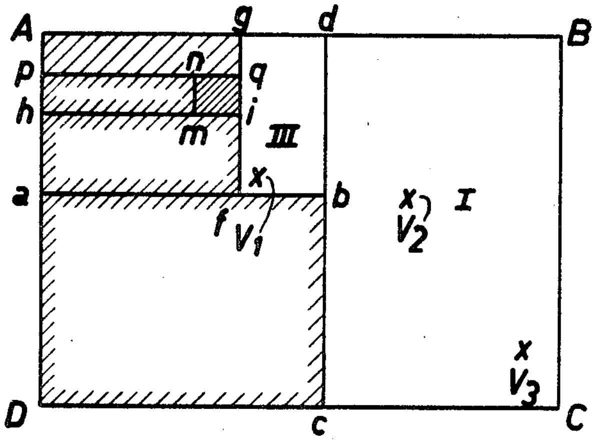
Figure 5C:
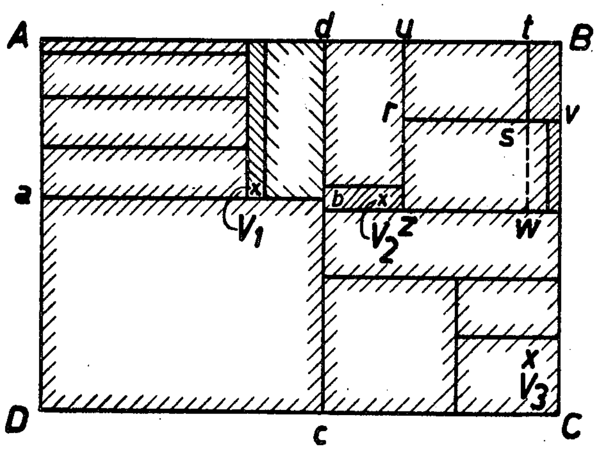

In the case shown in FIGURE 5a, this piece is represented by a rectangle *abc*D. A first-rank cut *cd* and a second-rank cut *ab* are chosen to remove this piece from the sheet. The piece is therefore classified as a second-rank piece. The ways in which the piece is thus placed and cut give rise to two remaining panels, namely a second-rank panel A*dba* and a first-rank panel *d*BC*c*. For the time being the first rank panel is not utilized. The order book scanning then continues, and the second-rank panel A*dba* is marked off in the same way with a piece whose cost-representing value is as high as possible and whose dimensions are compatible with the flaws. The latter piece is represented by *afih* and would be removed by a third-rank cut *gf* and a fourth-rank cut *hi*. The removal of this piece would leave a third-rank panel *fbdg*, which is not exploited for the time being, and a fourth-rank panel *hig*A. A further piece *hilk* having the highest possible value is marked on the last-mentioned panel and would be removed therefrom by an extra fourth-rank cut *kl*.

This piece has one common dimension with the fourth-rank panel *hig*A on which it was placed. This piece was taken from the order book as a result of the order book having been scanned first only for items sharing one substantially common dimension with the panel to be used. Of course, the pieces having the highest possible value are selected from the order book items having this feature. This scanning was also performed before the piece *afih* was selected but failed to disclose any pieces having a common dimension with the panel *abd*A, and the order book was scanned again line by line, irrespective of the order book classification chosen.

At this stage the third-rank panel *fbdg* has still not been exploited, while the fourth-rank panel *klg*A will be the next to be exploited. The dimensions thereof turn out to be smaller than the dimensions of the smallest item in the order book, and so panel *klg*A can not be exploited. This panel will be treated as cullet.

An initial first partial scheme, or pattern, has therefore been devised. The end of the development of this scheme results from the impossibility of using the panel *klg*A. However, the end of development may be due to some other reason, e.g., a limit set on the last permissible rank of a cut. Let us assume, for instance, that the highest permissible cut rank is *5* in preparing a scheme and that panel *klg*A still has dimensions such that an order book item can be cut from it. If such piece has the same width as the panel width *ka*, such piece could be removed by a fifth-rank cut (not illustrated) and the piece could, therefore, be located on the panel. The initial partial scheme then ends when a sixth-rank panel would not appear as the result of removing the particular piece concerned. On the other hand, if the piece has a width less than the width *k*A, it requires a fifth-rank and a sixth-rank cut to remove it, something which is not allowable. Such piece could not, therefore, be removed from the panel *klg*A and the same goes as cullet. This state of affairs also terminates the derivation of the initial partial scheme.

The initial partial scheme thus obtained is stored, e.g., in the computer memory, and then modified. First, the cullet piece *klg*A, which can not be replaced by any piece from the order book, is eliminated. The piece *hilk* is then eliminated and the panel *hig*A is considered to be a fresh panel to be exploited. The same is exploited as follows:

The scanning of the order book starts at the line corresponding to the piece *hilk* and then reviews the succeeding lines in those cases where the order book items are arranged by decreasing order of their values, or, in those cases where the order book is arranged in decreasing order of the mean values of the pieces in each container, the line corresponding to the piece *hilk* is first considered, and then successive entries are reviewed starting from the first entry of the container following that which contains the starting piece *hilk*. Scanning proceeds until the first piece is found whose dimensions are compatible with the flaws present in the sheet. Such piece has either a lower numerical value than the eliminated piece *hilk* or dimensions which differ considerably from the dimensions of such piece.

The latter piece is represented by *hmnp* in FIGURE *5b* and implies the selection of the fourth-rank and fifth-rank cuts *pq* and *mn*.

The resulting fourth-rank panel *pqg*A is not exploited for the time being, and the exploitation of the fifth-rank panel *miqn* commences. Such panel, since its dimensions are too small, goes as cullet. Thus, a new initial partial scheme has been devised. This partial scheme is compared with the partial scheme shown in FIGURE *5a* and the better scheme of the two, with respect to the particular criterion being relied on, is stored in the computer memory.

This newest partial scheme is to be modified. First, the fifth-rank panel *mign* is deleted from the scheme. Since it cannot be replaced by any other piece, an attempt is then made to also delete the fifth-rank piece *hmnp.* Such piece requires a fourth-rank cut which would produce the panel *pqg*A thus far unexploited. Therefore, the piece *hmnp* will only be eliminated once the possibilities of the panel *pqg*A have been explored. For the exploitation of the latter panel, the best cutting scheme for the panel *miqn* is maintained, which panel is presently cullet. Assuming that the fourth-rank panel *pqgA* is also to go as cullet, this newest partial scheme is compared with the better of the two previous schemes, and the best resulting scheme is stored while the previously better or best scheme is erased from the computer memory.

This third partial scheme, even if not retained, is in turn modified. First, the pieces *pqg*A and *mign* are eliminated. Since they were going as cullet because they were too small, they can not be replaced by other pieces. The piece *hmnp,* requiring a fourth-rank and a fifth-rank cut, is then eliminated, the possibilities of the fourth-rank panel *pqg*A having been completely explored.

Replacement of the piece *hmnp* by a piece of lower numerical value, as a result of order book scanning starting from the piece *hmnp,* leads to the devising of a fresh partial scheme and to modification thereof for the fourth-rank panel *hig*A, in just the same way as the elimination of the piece *hilk* from the pattern of FIGURE *5a* led to the various schemes described with reference to FIGURE *5b.* The operations of devising and modifying schemes succeed one another with relation to the fourth-rank panel *hiqp* until the partial scheme for the panel *hig*A contains only the smallest article in the order book. Immediately upon the development of each scheme it is always compared with the best scheme retained previously, and the best resulting scheme is stored.

The elimination of this smallest piece leaves once again the panel *hig*A for which a smaller piece can not be placed. Endeavors are therefore made to remove the piece *afih.* Such removal will not be carried out, however, since the latter piece requires a third-rank cut which left the possibilities of the third-rank panel *fbdg* unexplored. Therefore the latter panel is next explored in accordance with the same principles by consecutive constructions and modifications of partial schemes, the first partial scheme for this panel being constituted by pieces having the highest possible cost-representing numerical values. During exploration of this panel the various schemes are compared with one another while taking into consideration the best scheme retained for the panel *hig*A.

Replacement of the piece *afih* by a smaller piece initiates the construction of a fresh partial scheme and its consecutive modifications by a procedure similar to that which has been described in the foregoing.

Consequently, this new piece whose value is smaller than the value of the article *afih* creates a new third-rank and fourth-rank panels of which the third-rank panel will not be explored until all the possible combinations have been devised for the fourth-rank panel this possibly being preceded by a complete exploration of derived fifth-rank panels. The new piece will be eliminated only after the third-rank panel has been exploited, the operations being performed step by step.

Similarly, the second-rank piece D*cba* will be eliminated only after the first-rank panel *cCBd* has been tested by all the possible combinations which have in turn been derived by line-by-line scanning of the order book.

FIGURE *5c* shows a cutting scheme which covers the whole area of the sheet ABCD and which was obtained before it was possible for the piece D*c*B*a* to be replaced by a smaller piece. The pattern covering the primary, or first-rank, panel D*cd*A represents the best pattern found thus far for that panel.

The pattern which covers the primary, or first-rank, panel *c*CB*d* represents one of the schemes obtained in the search for the best scheme. This intermediate scheme has a few special features.

First, the flaw $V_3$ is considered to be allowable for the piece placed at the corner C of the sheet to be cut up.

An allowance has been made in this scheme for a restriction on the possible cutting procedures. The fifth-rank piece *rstu,* for the particular placement chosen, can be cut by either a fourth-rank cut *rv* and a fifth-rank *st* or by a third-rank cut *wt* and a fourth-rank cut *rs.* In both cases the remaining portion has the same width *t*B, but the length differ—i.e., it equals *ts* in the first case and *tw* in the second case. The width *t*B is assumed to be less than the smallest dimension which can be found for an item in the order book.

Consequently, no further piece from the order book can be placed in this remaining panel so that the cutting procedure to be retained is preferably the one which minimizes the length of such remaining panel, i.e., by cutting along *rv* and then *st,* in order to minimize waste of material and to enable a piece having a length greater than *rs* to be placed, as is the case for the fifth-rank piece disposed directly below the piece *rstu.*

For comparing the various schemes with one another in order to determine which is the optimum cutting scheme, the cost-representing numerical values allotted to each of the pieces are totalled for each pattern. The scheme for which the total is a maximum is retained, and the sheet is cut up in accordance with such scheme. In the case of sheets, the total area used for each scheme need not be considered since it is the same for all schemes and is equal to the area of the sheet ABCD for which the schemes are devised.

The entries corresponding to the piece making up the cutting pattern actually employed are removed from the order book. To cut the next sheet, the schemes are devised from the order book which has been revised by the deletion of the pieces obtained from the first sheet. The order book is periodically revised with new entries on the basis of fresh orders from customers. There is therefore no risk of a substantial reduction in the assortment of piece sizes to be cut, which might reduce cutting efficiencies as the contents of the order book become exhausted.

Another example of how the process according to this invention can be used concerns the cutting of a continuously manufactured ribbon or strip of glass. Basically, the same logic as has been described in the foregoing with reference to the cutting of sheets applies. However, allowance must be made for the fact that the area to be exploited does not have absolutely clearly determined dimensions, since the length of the strip on which the first cutting scheme is to be prepared is indeterminate. This ambiguity can be eliminated by imposing the restriction that any cutting scheme devised can contain only a limited and predetermined number of first-rank cuts, or that no one scheme can extend beyond a particular length of the strip.

FIGURE *6a* shows one of the cutting schemes obtained by the construction and modification of successive schemes and constituted by a number of primary or first-rank panels.

Figure 6A:
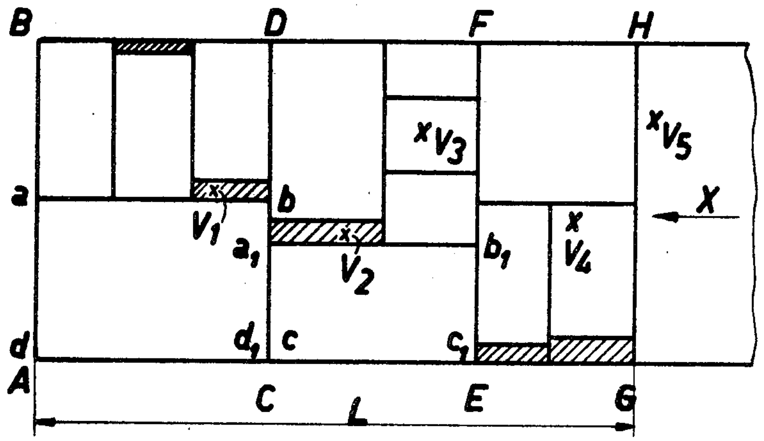
FIGURES 6*a* and 6*b* are pictorial views showing two steps in the development of a cutting pattern for a strip or ribbon according to the present invention.

This scheme was limited to three first-rank panels. To devise it, the strip was first examined for flaws. Flaw detection can be performed, in a manner similar to that described with reference to the cutting of sheets, at an inspection station past which the ribbon or strip moves. The direction of strip movement is represented by an arrow X in FIGURE *6a.* The strip inspection station is disposed upstream of the strip-cutting station and far enough away therefrom for a sufficiently large area of the strip to be available for cutting the pattern, this distance being the factor which actually determines the number of first-rank cutting lines which can be considered in the preparation of a given scheme. This is true because, before the first cutting scheme can be devised, all the flaws in that part of the strip for which the cutting scheme is to be devised must have been located, and the coordinates of such flaws must have been fed into the computer. In FIGURE 6*a*, flaws are shown at $V_1$, $V_2$, $V_3$, $V_4$, $V_5$. The flaws $V_3$ and $V_4$ are assumed to be acceptable in the finished pieces.

After the flaws have been located, a first piece *abcd* which has the highest possible numerical value and whose dimensions are compatible with the flaws is located on the strip or ribbon, exactly as for the material in sheet form.

Preferably, this first piece has one of its sides disposed along the strip front edge AB. Consequently, as far as positioning is concerned, this first piece can be positioned either in one of corners A or B or along the edge AB so as to be clear of the flaws, in a manner similar to that employed for locating the piece $a_3b_3c_3d_3$ of FIGURE 3. To remove the first piece *abcd*, a first-rank cut CD must of course be made across this strip, followed by a second-rank cut *ab*. These cuts are not, of course, actually made until the entire scheme has been finalized. The panel remaining to the left of the line CD is then marked off in an optimum manner with combinations of pieces determined by step-by-step constructions and modifications of possible schemes. When a modification is to affect the piece *abcd* itself, then, before such piece is eliminated from the scheme or reoriented therein, a piece $a_1b_1c_1d_1$ which has the highest possible value and whose dimensions are compatible with the flaws is placed to the right of the line CD. Placement possibilities for this piece are similar to the placement possibilities for the piece *abcd* but with the line CD being considered as being the front edge. The first-rank cut for this piece is along a line EF and is transversed to the direction of strip advance. The remaining second-rank panel $DFb_1a_1$ between the two first-rank cuts CD and EF is then explored too. The same procedure is followed for the third first-rank panel FHGE.

Figure 6B:
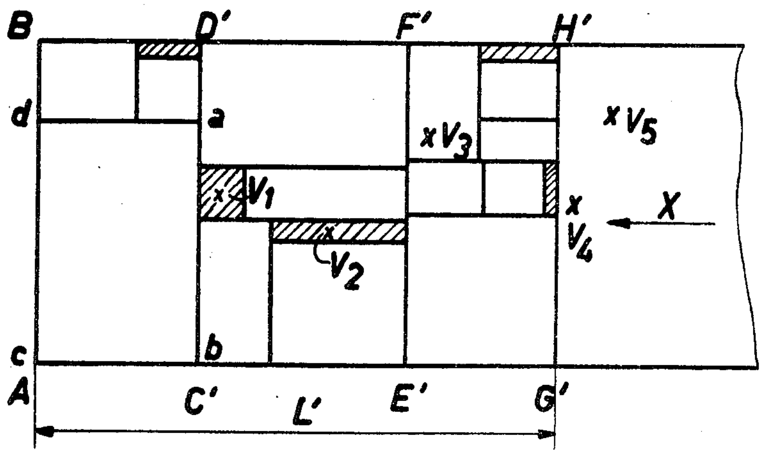

The number of primary cuts must be limited if the scheme-devising logic is to be able, at a given time, to replace or reorient the pieces which determine the locations of the primary cuts, something which would otherwise be impossible if the procedure logic simply dictated the endless addition of primary panels one after another. Since a limit has been set, at some moment the piece *abcd* is required to be removed and replaced by another piece, or to be simply reoriented. Thus, this can consist, for instance, of the choice of some other way of cutting the piece, for instance as is shown in FIGURE 6*b*. Starting with the piece thus placed, the sequence of operations is repeated until three further primary cuts C'D', E'F' and G'H' have been determined. Of course, modifying the first-rank panel ABCD to create another first-rank panel ABD'C' leads to modification of the other two first-rank panels DFEC and FHGE to create the panels D'F'E'C' and F'H'G'E' shown in FIGURE 6*b*.

In the case shown in FIGURE 6*a*, a strip length L was used to devise one of the schemes, whereas the scheme shown in FIGURE 6*b* uses a length L' which is smaller than L.

To determine which scheme to retain for the actual cutting, the cost-representing numerical values of the articles concerned in the scheme are totalled for each scheme and the total for each scheme is related to the particular strip area used which, in the case shown in FIGURE 6*a*, is the area of the strip disposed between the front edge AB and the third first-rank cut GH and, in the case of FIGURE 6*b*, is the area of the strip disposed between the same front edge AB and the third first-rank cut G'H'. The resulting comparison of each numerical value total and its associated strip area serves to determine which scheme represents the most efficient economic utilization of the strip material.

Once the best scheme has been determined and retained, the glass strip is actually cut in accordance with that part of such scheme which corresponds to the first panel of first rank ABCD or ABD'C', the remainder of the scheme being abandoned. In the example shown in FIGURE 6*b*, the strip is cut in accordance with that part of the scheme which is to the left of the cutting line C'D' on the assumption that the scheme shown is the optimum one, and that part of the scheme which is to the right of the line C'D' is abandoned.

Thereafter the latter line forms the new front edge of the strip and new schemes are devised starting from that edge. With this procedure, maximum consideration can be given at all times to all data relating to the pieces required and to the flaws in the strip. One noteworthy feature is that the choice of cutting scheme for the first panel ABD'C' takes into consideration the flaws $V_1$, $V_2$, $V_3$ which are not present on such panel.

The example has been described with the number of first-rank cuts limited to three, but the process is of course of use with the number of first-rank cuts limited to some other value, the choice depending upon conditions of strip exploitation and inter alia upon the time available between flaw detection and cutting implementation.

The allotment of a cost-representing numerical value to each of the order book pieces to be cut is based on experimental data. To deal completely with any particular order book which includes large, medium and small format pieces, the area of glass required either in sheet or strip or ribbon form to implement the order book can be either estimated before the cutting or determined after the cutting of pieces for filling the complete order book. A geometric cutting efficiency, which is the ratio between the total area of the cut pieces and the area of the sheet or strip from which they were cut, can therefore be determined. On the assumption that the cost price of an uncut square meter of glass has a value of unity, the cost price of a square meter of cut glass can be determined from the geometric efficiency.

However, this is not enough to determine the cost price of each cut piece because such determination also requires a knowledge of the effect of each of the formats on the cost price of a square meter of cut glass. To this end, a new order book is prepared by adding in the order book for which the geometric efficiency has already been determined a unit-area first, for instance, to the large format pieces. A new geometric cutting efficiency can then be determined for this modified order book. The difference between the latter efficiency and the efficiency of the unmodified order book is a value representing the influence per unit of area of the large formats of the order book on cost price and therefore reflects the marginal cost price of the large formats. The resulting marginal cost price of the large formats is obtained by subtracting from the cost price of the cut glass the value obtained by multiplying the said difference by the ratio between the area represented by all the pieces of the order book and the square of the geometric cutting efficiency of the unmodified order book.

The same determination can be made for medium and small formats. The various kinds of formats can be divided more finely than that just set forth. An example of the results of such a determination is represented in FIGURES 7 and 8.

Figure 7:
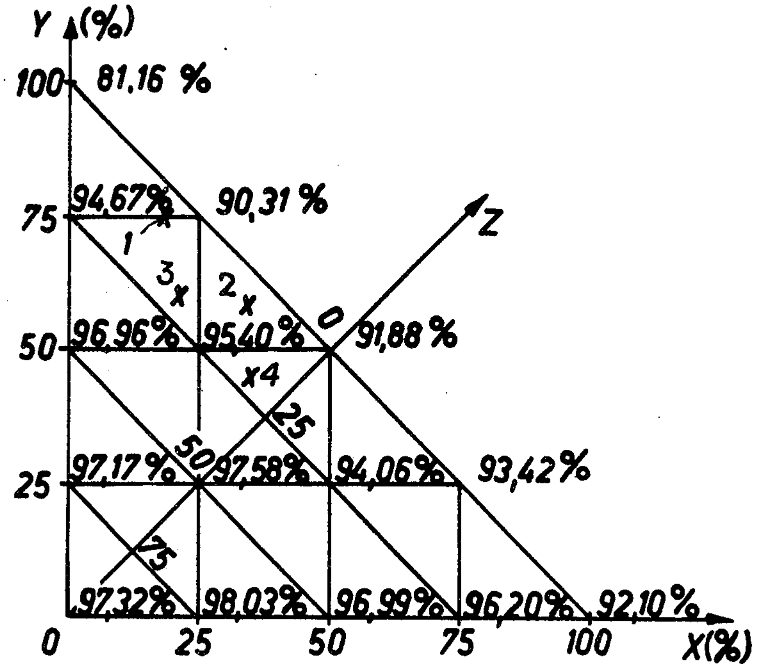
FIGURE 7 is a diagram used in explaining the present invention and illustrating the relation between cutting efficiencies and order book make-up.

FIGURE 7 shows in diagrammatic form the geometric cutting efficiencies for various order book arrangements, selected percentage efficiencies being shown on the diagram. The abscissa axis OX indicates the percentage of medium format pieces in the order book, the ordinate axis OY represents the percentage of large format pieces, and the axis OZ represents the percentage of small format pieces in the order book. In the preparation of this diagram, pieces having an area of 3.5 $m.^2$ or more were considered to be of large format, pieces having an area less than 1 $m.^2$ were considered to be of small format, and pieces having an area of from 1 to 3.5 $m.^2$ were considered to be of medium format. Other percentage cutting efficiencies could be derived by interpolation between the various points for which percentages are shown on the diagram. These cutting efficiency percentages are not to be confused with the format proportion percentages shown along the coordinate axes of the diagram.

To determine the proportion of each format for a given order book, which is represented by a given point on the diagram, it is only necessary to construct a line from the point perpendicular to each coordinate axis, and the intersection of each line with its associated axis represents the percentage of pieces of that format in the order book. Thus, point 1 in FIGURE 7 represents an order book having 20% medium format pieces, 75% large format pieces and 5% small format pieces.

Figure 8:
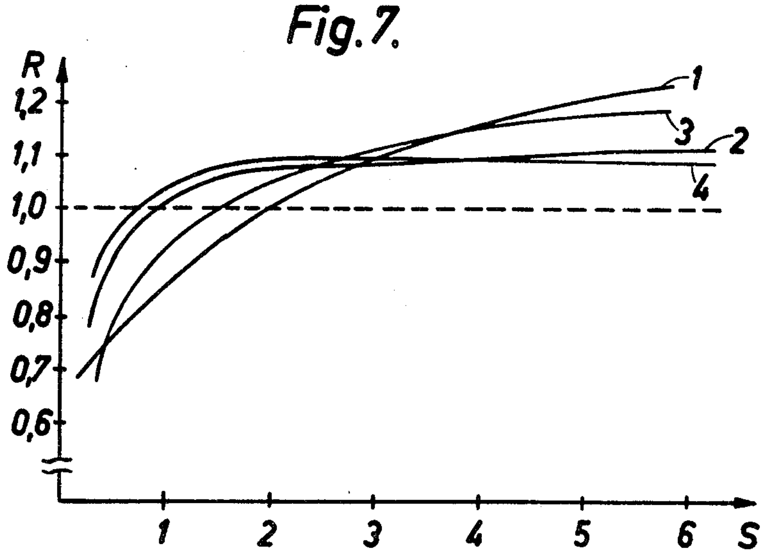
FIGURE 8 shows a series of curves indicating how the ratio R between the marginal first cost and the area S of the article varies in dependence upon such area S for different order book make-up.

Curves 1, 2, 3 and 4 in FIGURE 8 show the variation of the ratio R between the marginal cost price and the area of a piece as a function of the area S of pieces having different formats, prepared from the efficiencies shown in FIGURE 7, and in the manner hereinbefore described, for four order books whose contents are represented by points 1, 2, 3 and 4, respectively, in FIGURE 7. These curves show that the marginal cost prices of pieces of identical format depend upon the distribution of the total order book contents. For any given order book, the numerical value to be allotted to each piece of the order book is equal to the marginal cost price of such piece.

By preparing a family of curves, like the curves shown in FIGURE 8, for a large number of possible order book arrangements, the values allotted to the order book pieces can be modified periodically in dependence upon the evolution of the order book composition with time, so that the establishment of the economic efficiency of the cutting operations comes very close to reality. For instance, in the case in which an order book covering a period of three or four months is available, order book composition is checked every fortnight and, if order book composition has altered appreciably, the values allotted to the pieces are modified accordingly.

The curves shown in FIGURE 8 were prepared for a particular glass quality—in the present case, very good quality window glass suitable for making mirrors. Similar curves can be prepared for other glass qualities, e.g., plate glass, ordinary window glass, and so on. The corresponding curves will differ from the curves of FIGURE 8 since the quality to be achieved alters the geometric efficiency of cutting as well as the marginal cost price of the various formats. If, for instance, quality is higher, cutting requires a bigger area of glass than was required for the first-described quality, and the geometric efficiency decreases. Also, large formats affect the marginal cost prices more than do the same formats of the first-described quality.

Figure 9:
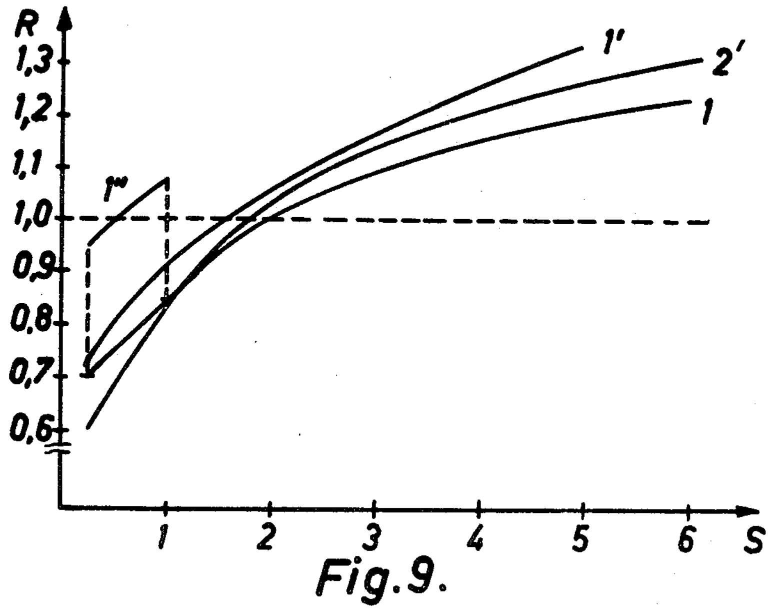
FIGURE 9 shows curves similar to those of FIGURE 8 as affected by various restrictions.

This is so because, in a production process in which flaw density and the distribution of the flaws among different kinds are assumed to remain constant, fewer flaws are allowable in the higher-quality pieces than in the lower-quality pieces. In FIGURE 9, curve 1 is identical to the curve 1 of FIGURE 8. Curve 1′ corresponds to an order book having the same makeup but intended for a higher-quality glass, for example plate glass.

Variations in the density of the flaws present in the sheets, ribbon, or strip have a similar effect, modifying the geometric efficiency of cutting and affecting the marginal cost prices, since a reduction in such density makes it easier to cut an order book which has been modified by the addition of a unit surface area to the large formats thereof.

A flaw-free glass sheet or strip is assumed to be represented by the curve 1 in FIGURE 9. Curve 2′ of FIGURE 9 was prepared for the same quality of glass with the same order book composition as for curve 1 but with a $0.1/m.^2$ flaw density, each particular flaw concerned being point-like, i.e., having an area of 1 $cm.^2$ or less. Once the marginal cost prices of the pieces for various order book compositions and various glass qualities are available, some form of priority can readily be introduced for the pieces. For example, the marginal cost price of high priority pieces can be increased arbitrarily.

Referring to FIGURE 9, it will be assumed that, at a given moment, small pieces, whose areas are less than 1 $m.^2$, which must be cut very quickly are introduced into the general order book. It is assumed that the curve to be considered is the curve 1. If the marginal cost prices established by curve 1 were allotted to the high priority pieces, the same would not be given first priority during the development of the cutting schemes because the logic on which these schemes are based first prepares the scheme with the highest possible values, then merely partly modifies the scheme subsequently during a predetermined period of time. For the pieces to be cut very rapidly, that part of the curve which corresponds to formats smaller than 1 $m.^2$ is shifted upwardly, for instance, up to the cost price level for medium formats, as represented by a line 1″. Except for the small urgently needed pieces, whose values are set by the curve 1″, values taken from the curve 1 are allotted to all the pieces of all the formats. Of course, the amount of upward shift of a portion of curve 1 to curve 1″ depends upon the degree of the urgency.

The priority thus obtained is relative and not absolute. Small formats are given an advantage, but this does not mean that large and medium formats will not be cut. On the average, however, small formats will be cut more rapidly. Urgency, or priority, is therefore taken care of but without departing from economic efficiency as the main criterion.

Other important contingencies, such as market trends, the progress of the packaging operations, restoration of synchronism between the rhythms of the various sections of the production line and so on, can also be allowed for by acting on the marginal cost prices of the pieces.

Practice of the process can also be subject to a restriction in cutting scheme preparation to allow for the conditions under which the cut pieces are to be handled. The order-book pieces are intended to be grouped in a number of handling units after cutting. For glass pieces the handling units can be boxes, containers, frames or stands. If the order book is large, the number of handling units, for instance, boxes, is also large. If schemes are prepared for the complete order book, the pieces which will be obtained after cutting are intended for all the boxes. However, all of the boxes can not be simultaneously disposed along the end of the cutting line in loading positions, so that the gains provided by increased cutting efficiency are rapidly offset by the demands on the equipment and staff required to sort the pieces. If the complete production line is to have a satisfactory economic efficiency, the number of containers which are being filled simultaneously at the end of the cutting line must be limited, while maintaining the cutting pattern possibilities at a maximum.

It will be assumed that at a given time the order book lists a number of pieces intended for 500 containers numbered consecutively from 1 to 500. It will be assumed that the processing capacity along the end of the cutting line is ten containers, this latter number being determined by the available space and sorting facilities. Each container is intended to receive a particular number of pieces which are either of the same dimensions or of different dimensions.

In a first stage, the cutting schemes are devised on the basis of pieces from the complete order book but with the restriction that the pieces are intended for a maximum of ten containers. The first scheme or schemes retained determines the ten containers to be loaded first. In FIGURE 10, these first ten containers are represented by their order numbers placed along the straight line segments at right angles to the horizontal line passing through $t_0$. This horizontal line is disposed alongside the output end of the line of delivery, L.D., of the cut pieces. The length of the segment associated with each container number, each segment being delimited by short horizontal marks, represents the time period required for the arrival of the pieces to fill the container. The various time periods are measured from the start of operations at time $t_0$ and are indicated by the vertical coordinate of FIGURE 10. It is assumed in FIGURE 10 that the ten containers were determined by the first scheme.

When the ten containers have been thus selected, the succeeding schemes to be retained can include only pieces intended for those ten containers which begin to be filled at the instant $t_0$, this condition being imposed until any of these ten containers has been completely filled. One such occurrence is indicated by $t_1$ in FIGURE 10 and corresponds to the completion of filling of container No. 85. The cutting schemes are then revised on the basis of the complete order book, but with the restriction that the pieces making up the new schemes consist solely of those intended for the other nine containers which started to be filled at the time $t_0$ and which have not been completely filled at the time $t_1$, and for a single new container which replaces container No. 85. The particular cutting scheme retained therefore determines which container is to follow container No. 85 in the filling line. In the example in FIGURE 10, this next container is No. 210.

The same operation is carried out at the times $t_2$, $t_3$, $t_4$, etc. corresponding to the completion of filling of containers Nos. 9, 270, 402, etc., respectively, which are replaced on the filling line by containers Nos. 399, 87, 120, etc., respectively.

In the example illustrated, for example, at the time $t_{12}$, containers Nos. 399, 210 and 87 are finished simultaneously. New cutting schemes can then be prepared on the basis of the complete remaining order book, and the scheme retained determines the selection of three new containers which succeed the completed containers. At each of the times $t_{13}$ and $t_{19}$, by way of further example, the particular cutting scheme retained selects two new containers, i.e., Nos. 42 and 67 at time $t_{13}$. Cutting logic is therefore fully used but cutting line capacity is never exceeded.

Figure 10A:
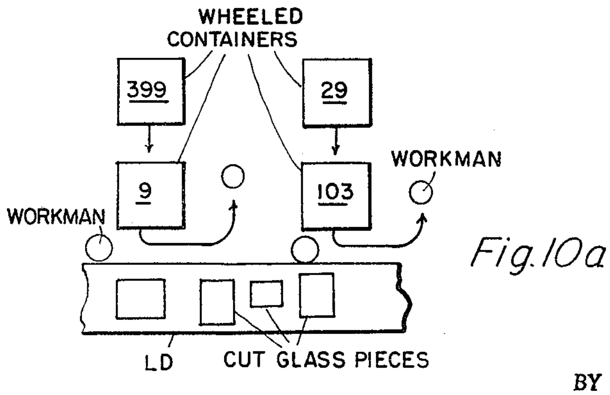
FIGURE 10*a* is a simplified pictorial view of a loading area employed in the practice of the invention.
Figure 10:
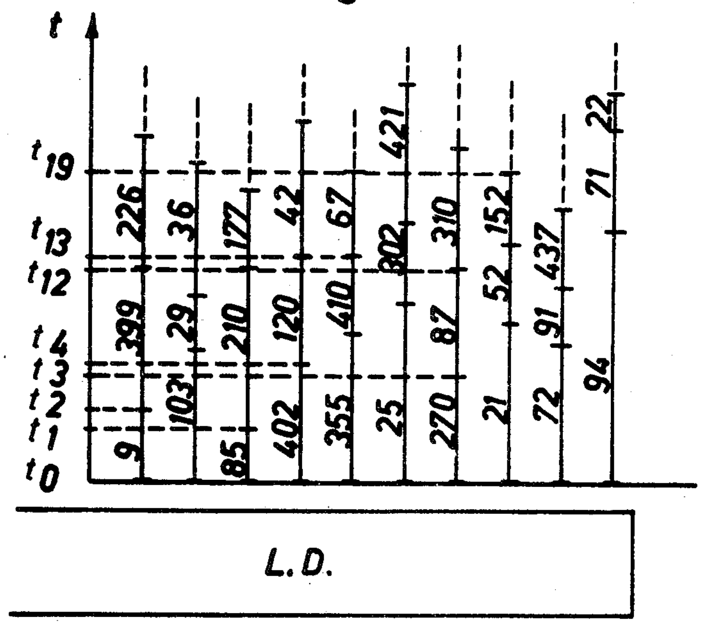
FIGURE 10 is a diagram used in explaining the present invention.

FIGURE 10*a* is a simplified pictorial view of a portion of a practical embodiment of the loading area depicted in FIGURE 10. Cut glass pieces are delivered by the line LD to the loading area. Adjacent the delivery line are disposed a series of containers, the containers 9 and 103 being shown. These containers could be constituted by boxes mounted on wheeled carriages. Workmen stationed along the delivery line select those cut glass pieces which are intended for their respective containers, the pieces having been suitably marked or the workman knowing which pieces to select. Each time a piece for the container to which a particular workman is assigned comes along, the workman takes the piece from the line and places it in his assigned container. When his container has been filled, the workman, or another workman, simply rolls the container out of position and brings the next succeeding container into loading position. For example, after the container 9 has been loaded, a workman pulls that container out of position and brings container 399 into loading position. Similarly, when container 103 has been filled, another workman rolls this container out of position and brings container 29 into loading position.

In order that cutting and loading in containers will not be slowed down by the time taken for a new container to move into filling position, it would be useful to know the sequence of the containers in the ten processing lines, as is shown in FIGURE 10, before cutting starts. This can be done by simulating the cutting of the order book items, which must be carried out without allowance for flaws in the actual material, under the same conditions as those existing during actual cutting. This simulation can be performed by the computer. For this simulation the computer can also produce imaginary flaws in a random, or any other, distribution, for instance in accordance with a Poisson distribution, and with any desired flaw concentration.

In some cases, glass is produced continuously twenty-four hours a day but cutting is carried out for only a part of the twenty-four hours. In this event, the glass strip or ribbon is systematically cut into sheets of predetermined dimensions, and twenty-four hours of sheet output are cut, for instance, during an eight-hour period.

Cutting is simulated to determine the container arrival order for the eight-hour period. A scheme similar to that of FIGURE 10 results, but with the single difference that the actual container filling times are different from the estimated times, and the choice of a particular container may sometimes differ from that which was envisioned. However, we have found that the latter event occurs very rarely. If the computer is large enough, simulation can be performed simultaneously with actual cutting.

When the glass sheets are then actually cut, some filling lines have a higher filling rate than was estimated whereas other lines have rates lower than those estimated. This is because actual cutting takes into account actual flaws in the sheets. Some filling lines would therefore finish in less than eight hours and others would take longer than the specified eight hours. The rates of the various lines must therefore be equalized so that all of the lines will finish substantially at the same time at the end of the eight-hour period. This result can also be achieved by action on the cost-representing numerical values of the individual pieces.

It will be assumed, for example, that the processing line starting with container No. 9 is running too fast so that the time $t_2$ required to finish container No. 9 is less than was estimated before cutting. If this rate is maintained for the processing of container No. 399, action is taken on the speed of this line. To this end, the value of the pieces intended for the next container in this line is reduced. This value, or values, is known from the container arrival order plan which was determined before cutting. The container concerned in this case is No. 226. Such modification of the marginal first cost price is effected in a manner similar to that described in connection with the establishment of priorities. When a line is running slower than anticipated, the marginal cost price of the pieces for such line is increased. The rate of advance of containers in the various lines of the group can therefore be controlled very readily.

When sufficient data is not available to establish the marginal cost price of the pieces, a good approximation of this price can be obtained by the formula $$(n(S^{1+\epsilon})+A)$$

The unit cost price is a datum which is generally available, since it is based solely upon the conventional elements appearing in the establishment of the cost price, such as the material and energy consumptions, depreciation, etc.

The term $S^{1+\epsilon}$ is also easy to determine. It defines the geometric cutting yield. The area of glass utilized to cut a specific number of pieces having a certain total area can very easily be determined. From these elements the value of $\epsilon$ is deduced and it is attributed to the area of each of the pieces.

The constant A can take account of the various important contingencies which have been defined above.

This value is modified as a function of the exploitation circumstances. Thus A is taken as equal to zero when the piece to be obtained is part of a normal order. It assumes values *a*, *b*, *c* . . . which increase successively with the degree of urgency, or priority. These values *a*, *b*, *c* . . . are determined empirically. They are, for example, equal to 20 and 42, respectively, for pieces which must be expedited within a fortnight, and for pieces which have already been cut but which must be cut again as a result of breakages.

It is also the constant A which will be operated on in accordance with the different situations to be met, e.g., to balance the lines of a handling group, etc.

A description will now be given, with reference to FIGURES 11*a* to 11*f*, of a simplified example of the program for a computer for working out the best cutting scheme, these figures thus also representing the layout of a suitable special computer for this purpose. The program is given in diagrammatic form and is concerned merely with the main operations for preparing the cutting scheme. Secondary operations, such as data storage and data read-in and read-out to and from various units during program operation are not shown in order not to unduly complicate the drawings and to facilitate the explanation of the novel features of the computing operation.

Also, the program shown is designed to cut a flaw-free glass sheet. Indications will be given in the description of the program as to when the need arises to take the coordinates of possible flaws into account. The invention must therefore not be considered as being limited to this exemplary program but covers programs containing the elements previously referred to.

Figure 11A:
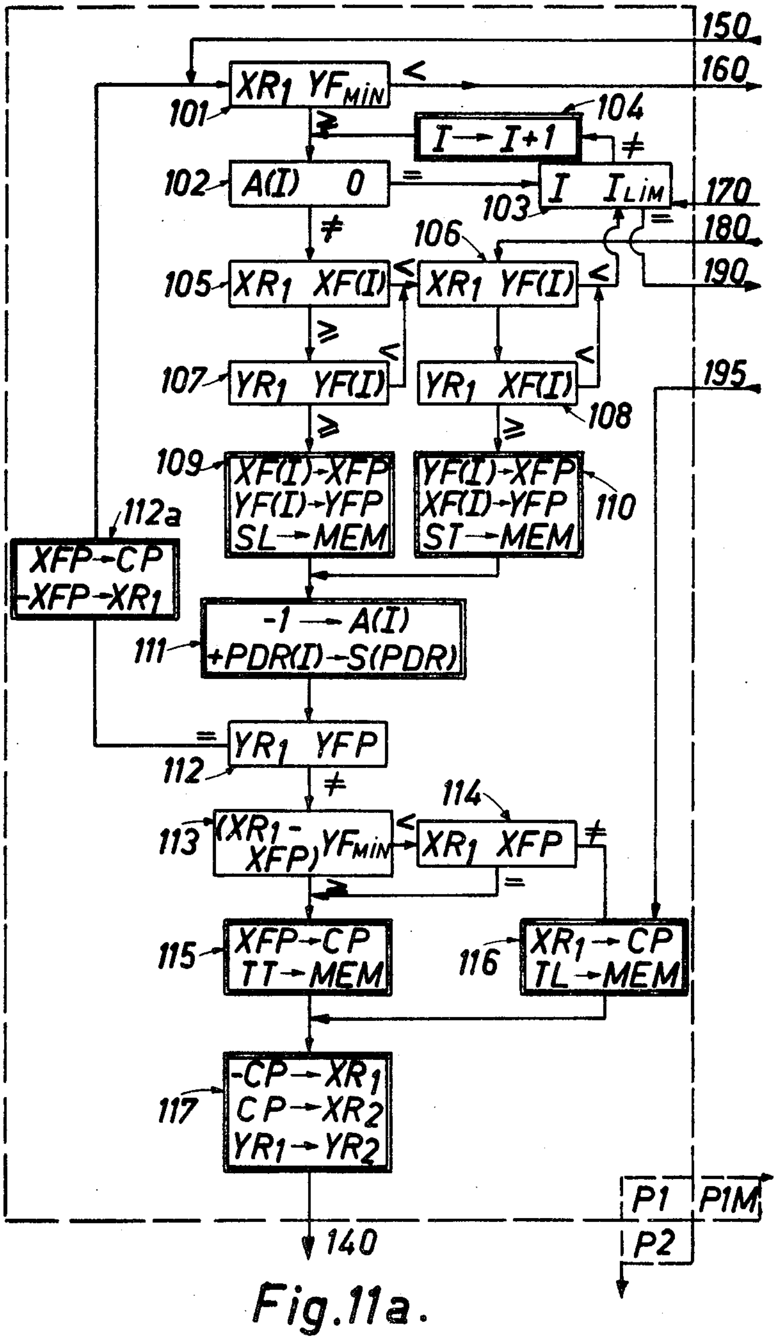
FIGURES 11*a*, 11*b*, 11*c*, 11*d*, 11*e*, 11*f* and 11*g* show the parts of a block diagram of a single cutting pattern program according to the present invention.
Figure 11B:
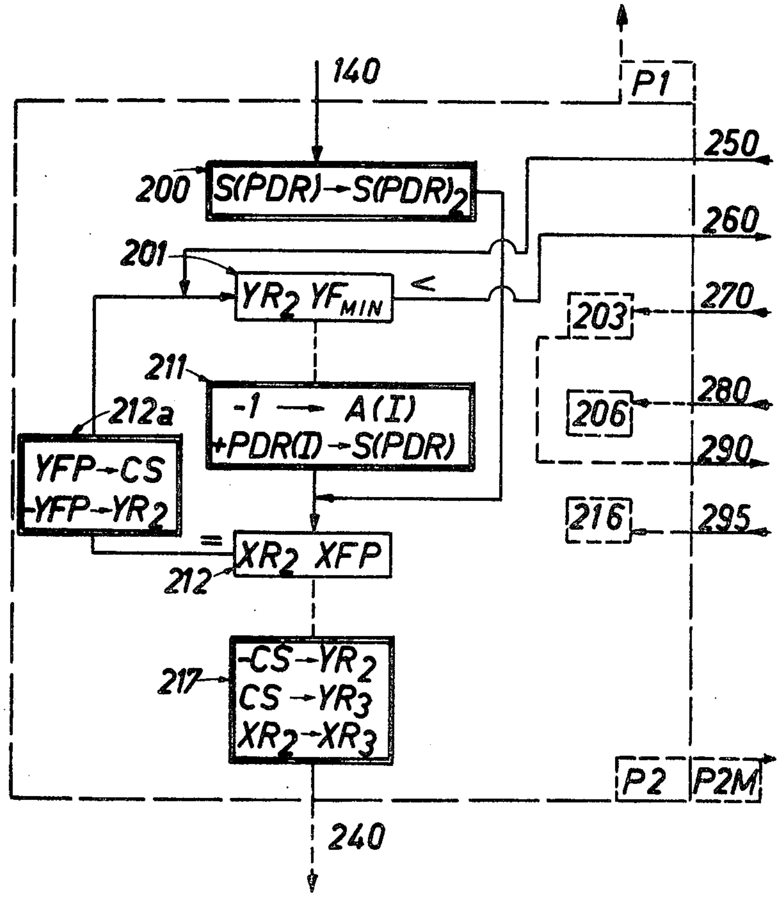
Figure 11C:
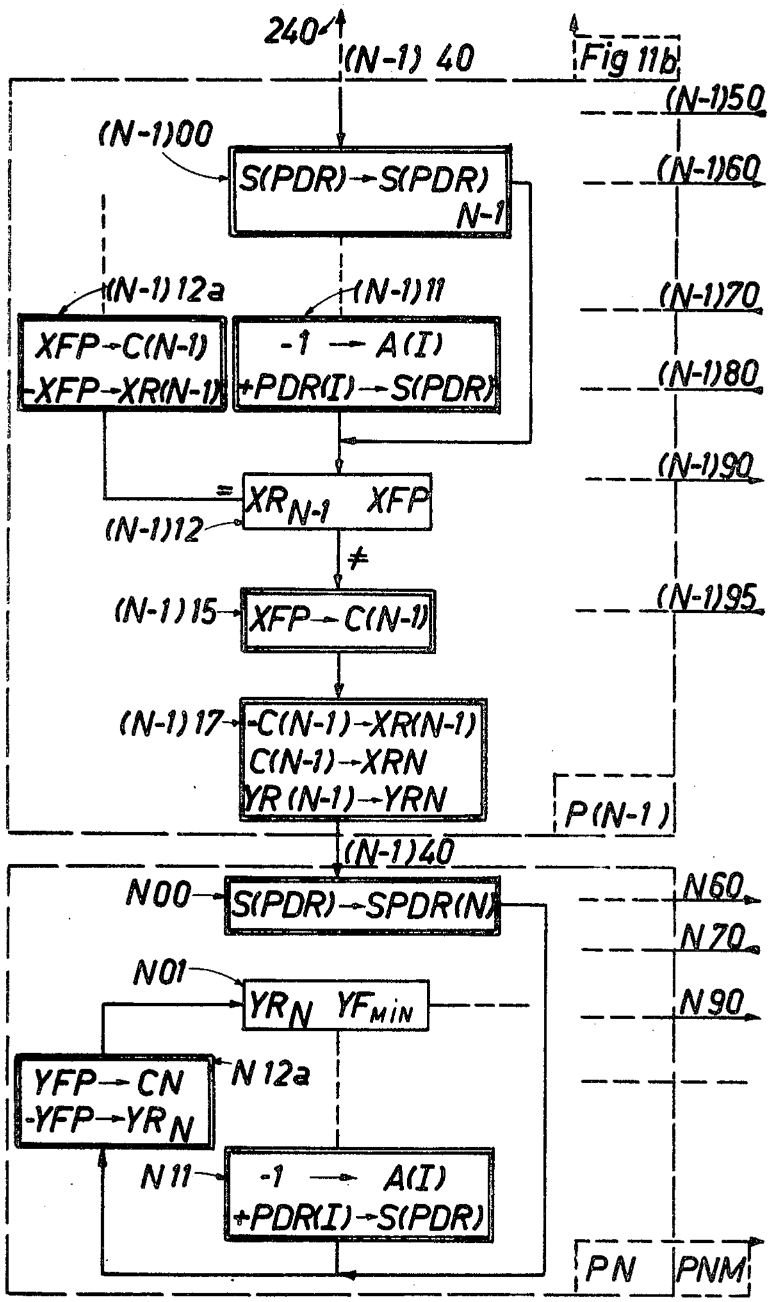
Figure 11D:
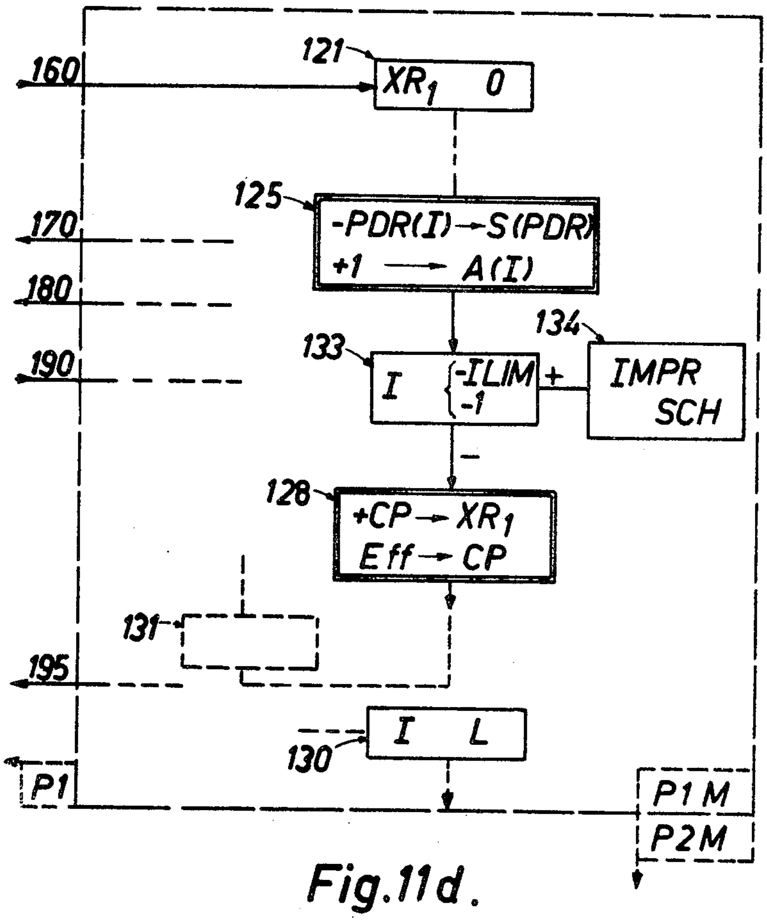
Figure 11E:
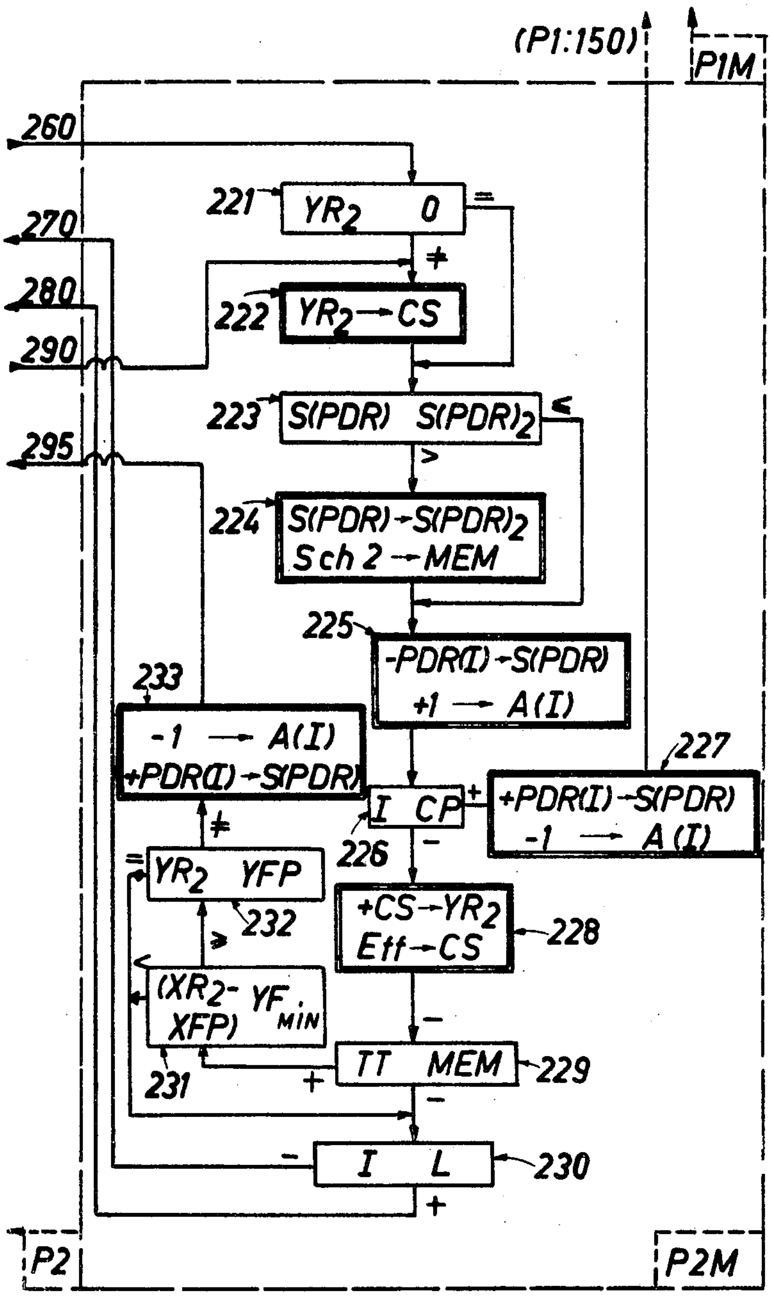
Figure 11F:
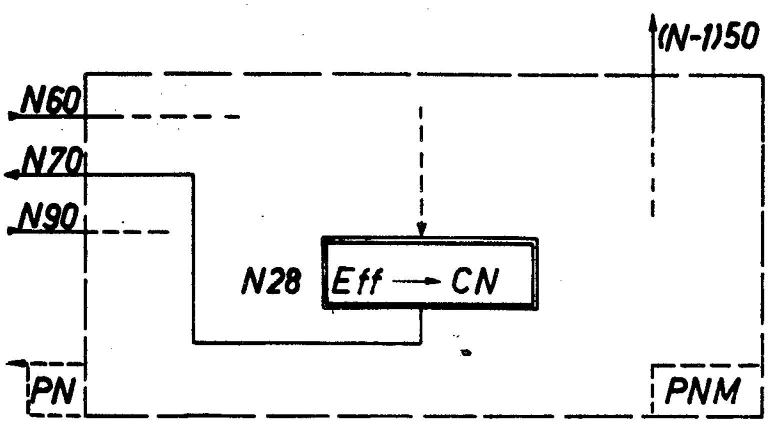
Figure 11G:
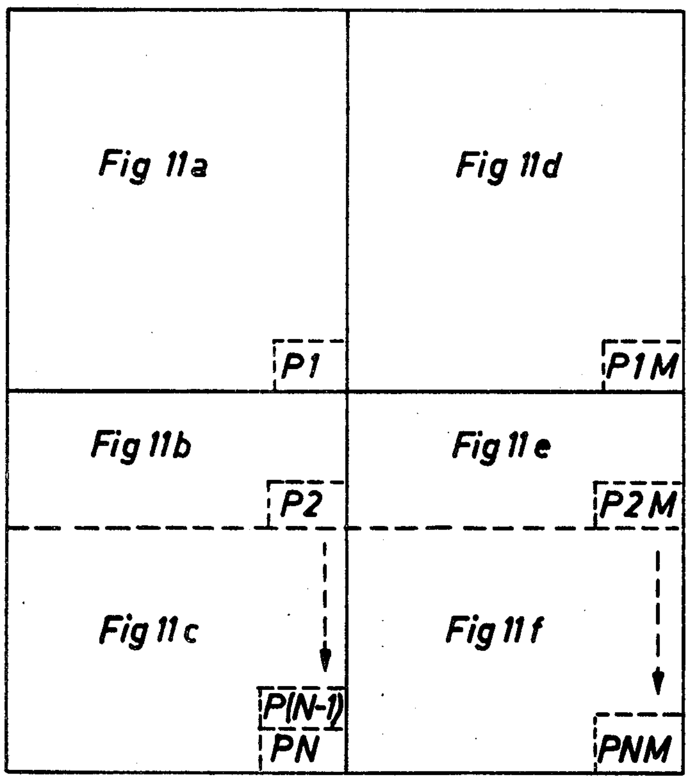

FIGURE 11*g* shows how FIGURES 11*a* to 11*f* are arranged relative to one another to give the complete layout of the program.

Data concerning the glass sheet—i.e., its dimensions, flaw coordinates, area and so on—and data concerning the pieces to be cut—i.e., their dimensions, the number of pieces of the same format, their cost prices, areas and so on—are assumed to be stored in a memory store not shown in the drawings.

Storage of the data relating to the pieces to be cut is such that the pieces are classified in decreasing order of cost-representing numerical values. The order book contents are stored in a number of lines which will hereinafter be given the reference I. Each line represents a desired format. The number of required pieces having this format is indicated opposite the line. This number is represented by A(I). The last line of the order book thus classified has the reference $I_{LIM}$ and corresponds to the format having the lowest cost price. The same reference I is used, when the order book is classified in decreasing order of container values, to denote each order-book line.

The complete program is formed by two groups of partial programs P1, P2 . . . $P(N-1)$, PN and P1M, P2M . . . $P(N-1)M$, PNM. The first group contains the programs which create parts of the cutting scheme, and the programs of the second group modify some parts of the scheme.

The programs of each group which have the same index serve to determine cuts having a rank equal to the index. For instance, the programs P1 and P1M determine first-rank cuts, the programs P2 and P2M determine second-rank cuts, and so on. The partial programs of any single group are, as a rule, all the same except for modifications made to programs which are situated at the start or end of the group and which will be referred to in the description to be presented.

In the diagrams in FIGURES 11*a* to 11*f*, the single-frame rectangles represent logic operation elements, and the double-frame rectangles represent arithmetic and/or transfer operation elements, each of which can be constituted by a well-known arrangement.

To start with, there is presented a glass sheet to be cut whose dimensions are represented by $XR_1$ and $YR_1$. It will be assumed hereinafter that the glass sheet has its length disposed along the axis OX and its width along the axis OY of a coordinate system XOY. Similarly, each piece to be cut has a length XF and a width YF. To prepare the cutting scheme, a first piece must be placed on the sheet and the location of a primary cut determined. This operation is performed by the partial program P1 shown in FIGURE 11*a*. Such program is carried out by a first logic element 101 which compares $XR_1$ and $YF_{MIN}$, the latter representing the smallest dimension for a piece listed in the stored order book. The operations of removing the two data items from the store are not shown, but are well known in the art. If the comparison shows that $XR_1$ is less than $YF_{MIN}$, a shift is made to program P1M (FIGURE 11*d*) via connection 160. On the other hand, if the comparison shows that $XR_1$ is greater than, or equal to, $YF_{MIN}$, an element 102 scans the first line I of the order book store, and checks whether A(I) differs from zero, i.e., if pieces whose dimensions are indicated on such line are still required to be cut. If the answer is negative, i.e., if A(I) equals zero, a logic element 103 checks whether the scanned line I was the last line $I_{LIM}$ of the order book. If the answer is affirmative, a shift is made via connection 190 to the partial program P1M. If the answer is negative, a transfer element 104 gives an instruction to scan the next line I of the order book store.

As the order book lines are thus scanned in sequence, a line I will appear for which A(I) is other than zero. When this occurs, an element 105 compares sheet length $XR_1$ with the length XF(I) of the piece entered on this particular line I. If the length $XR_1$ is greater than this XF(I), a logic element 107 compares width $YR_1$ with the width YF(I) of that particular piece. If the comparison shows that $YR_1$ is greater than or equal to YF(I), this means that the piece of dimensions XF(I), YF(I) can be placed lengthwise on the sheet of dimensions $XR_1$, $YR_1$. An element 109 then decides to consider the width YF(I) of such piece as the dimension along the OY axis, or as the YFP dimension, The piece is therefore considered to be placed lengthwise and this information is stored as SL, this storing being indicated by SL→MEM in the element 109.

If any of the comparisons made by the elements 105 and 107 gives any other result than the one just described, the elements 106 and 108 would be instructed to make similar comparisons for placing the piece transversely to the position described above. If the piece can be so placed transversely, an element 110 makes the decision and stores the indication ST. If the piece to be cut can not be placed transversely either, there is a return to the element 103, as indicated by the line at the right-hand sides of the elements 106 and 108, for exploring a succeeding line I of the order book store.

When the decisions have been made either by the element 109 or by the element 110, an arithmetic operation element 111 substracts 1 from the number A(I) of pieces to be cut and adds the cost PDR(I) of the piece retained to the total cost S(PDR).

At this stage, the program P1 has determined the way in which the piece should be placed on the glass sheet for cutting. This determination has considered only the sheet dimensions $XR_1$ and $YR_1$, but has not considered flaws. To make allowance for the flaws, the number of elements similar to 105, 107 and 106, 108 must be increased sufficiently to compare XF(I) and YF(I) with the flaw coordinates which are also stored as dimensions along the coordinate axis OX and OY.

The choice of the first-rank cut required to remove from the glass sheet the piece located thereon now has to be made. Accordingly, a logic element 112 compares sheet width $YR_1$ with that dimension of the piece which extends along the OY axis and which is represented by YFP. If the two dimensions are qual, an arithmetic element 112*a* decides to take the dimension XFP to define the position along the OX axis of first-rank cut CP and subtracts XFP from $XR_1$. This means that the piece to be cut extends across the entire width $YR_1$ of the glass sheet and can be removed by just one first-rank cut. In this eventuality, there is a return to the logic element 101, and the panel still be exploited is the initial sheet $XR_1$, $YR_1$, less the first piece XF(I), YF(I), or XFP, $YR_1$. For this new exploitation the values of $XR_1$ and $YR_{1'}$ to be considered are respectively the difference value generated in element 112*a* and the width of the original sheet.

If the element 112 finds that there is a difference between $YR_1$ and YFP, this means that a second-rank cut will also be required to remove the first piece. However, before the position of this cut is determined, it is necessary to determine that location of the first-rank cut which will permit optimum utilization of the panel remaining after the second-rank cut since, as already stated, if the remainder can not be used, it must be made as small as possible. This optimum cut is determined by elements 113 to 116.

The element 113 compares the difference $(XR_1-XFP)$ with $YF_{MIN}$ on the basis of stored information fed thereto. If this comparison shows that the difference is greater than $YF_{MIN}$, i.e., that the remaining panel can still be used, the element 115 decides to use the length XFP to determine the position of the first-rank cut CP, and the transverse-cut indication TT, corresponding to CP, is stored in the memory MEM. If the comparison of the difference $(XR_1-XFP)$ with $YF_{MIN}$ shows that the difference is less than $YF_{MIN}$, $XR_1$ and XFP are compared in the element 114, and in the case of a difference, the element 116 decides to take the entire length $XR_1$ as determining the location of the first-rank cut CP, which cut thus coincides with the rear edge of the sheet. The element 116 also stores in the store MEM the lengthwise-cutting indication TL. In the program shown in FIGURES 11*a* to 11*f*, this lengthwise cut is considered as a second-rank cut.

When the element 114 finds that $XR_1$ and XFP are identical, there is a shift over to the element 115.

Once the first-rank cut has been determined, the second-rank cut is determined by the program P2. To shift to this program, the program P1 comprises an arithmetic element 117 which subtracts the distance along the OX axis of the first-rank cut CP from $XR_1$. This means that a first-rank panel whose dimensions are $(XR_1-XFP)$ along the OX axis and $YR_1$ along the OY axis remains to be exploited.

The element 117 also decides to use the distance of CP from the origin of OX as the dimension $XR_2$ along OX, and to use $YR_1$ as the dimension $YR_2$ along OY, of a new rectangle to be exploited by the program P2. The transfer from program P1 to program P2 is effected via the connection 140.

The program P2 shown in FIGURE 11*b* comprises all the elements of the program P1 and an extra element 200 at which the connection 140 terminates. Like elements of both programs have numerical references whose tens and units digits are identical and whose hundreds digit is the same as the number of the program to which they belong. This rule also applies to the other partial programs. Also, the letters X and Y used in the odd-number programs are replaced by Y and X, respectively, in the even-number programs.

The element 200 stores the S(PDR) of the scheme obtained by the program P1 in the store location $S(PDR)_2$ of the program P2.

From the element 200, there is a transfer to the logic element 212, the function of which is to compare $XR_2$ with XFP so as to determine whether the first-rank cut determined by the program P1 is or is not coincident with an edge of the primary panel. If $XR_2$ is equal to XFP, i.e., if the first-rank cut is coincident with such edge, an element **212*a* decides to use YFP to determine the location of the second-rank cut CS and subtracts YFP from $YR_2$, the element 117 having selected $YR_2$ to be equal to the height of the sheet. The subtraction result delivered by the element 212*a* constitutes a new dimension $YR_2$ along the OY-axis of a panel of second rank to be exploited, the dimension along the OX-axis $XR_2$ of which is equal to the dimension XFP defined by the program P1**.

This new measure of $YR_2$ is compared in the element 201 with $YF_{MIN}$, and thereafter the same procedure as the procedure of the program P1 is followed to position a piece for cutting in the rectangle of dimensions $(XR_2, YR_2)$ until a transfer to element 217 is eventually made, whence a shift is made via a connection 240 to a program P3 which is not shown in FIGURE 11*c*. It should be noted that program P2 also includes elements comparable to elements 102 to 110, 111 and 113 to 116 of program P1 but the manner of connection of these elements is omitted from FIGURE 11*b* because their operation is identical to that of the corresponding elements of FIGURE 11*a*.

When the element 212 finds that $XR_2$ is different from XFP, $XR_2$ therefore being equal to $XR_1$, due to the passage of the program P1 through the elements 114 and 116, the logic sequence of the elements 212 to 217 is activated so as to determine the second-rank cut for removing the piece located by program P1. A third-rank cut is required to exploit the remaining rectangle and to remove a piece therefrom and this cut will be determined by a program P3 which is not shown. In this particular case, the program P2 therefore locates no pieces to be cut, so that the elements 201 to 211 do not operate.

All the partial programs which follow the program P2 and which determine cuts of consecutive ranks are identical to the program P2 except for the last two programs, namely $P(N-1)$ and PN, where N is the cut rank at which it is required to stop.

The partial program $P(N-1)$, shown in FIGURE 11*c*, is similar to the program P2, except that starting from the element $(N-1)$ 12, the elements corresponding to the elements 213, 214 and 216 (not shown in the drawings) do not reoccur. Their presence would lead to a cut of rank $(N+1)$ which is of course beyond the set limit.

The partial program PN is similar to the program P2, but in this case the elements corresponding to the elements 212 to 217 are missing, since there is no need to change over to any next program, the cuts of rank N being the final cuts permitted.

The group of partial programs P1 to PN has so far dealt with the construction of a first partial cutting scheme. The same is formed by the pieces having the highest possible cost values, since the pieces are classified in decreasing order of cost, and the order book thus classified is scanned line by line, a piece being placed on the sheet for cutting whenever an order-book line is scanned which corresponds to a piece having dimensions compatible with the dimensions of the sheet or with the remainder thereof, and also being compatible with the flaw coordinates.

The complete program devises other schemes starting from this first partial scheme. First, some of the initial scheme must be eliminated. This operation is performed by the partial-program group P1M to PNM. Second, the eliminated part of the scheme is reconstructed in a different form. The new part of the scheme is developed by the partial-program group P1 to PN.

As in the case of program group P1 to PN, all the programs P1M to PNM are identical except for the programs P1M and PNM which are similar to the other programs in the group except for several minor modifications.

One program of the latter group, more particularly the program P2M is shown in FIGURE 11*e*. As is shown in FIGURE 11*e*, the transfer from program P2 to program P2M is effected via two connections 260 and 290. The first connection 260 extends from the element 201 of the program P2. Element 201 compares $YR_2$ with $YF_{MIN}$. Line 260 is activated when $YR_2$ is smaller than $YF_{MIN}$, i.e., when the remaining rectangle can not be exploited. Connection 290, which comes from element 203 of program P2, is activated when, as a result of the comparisons made by the elements 205 to 208 (not shown) of the program P2, no further piece can be positioned for cutting, and also when all the order-book lines have been scanned.

In the case in which the connection 260 gives a signal to the program P2N, a first logic element 221 checks whether $YR_2$ is equal to zero, i.e., whether the initial panel of dimensions ($XR_2$, $YR_2$) left by the program P1 is nil or completely exploited. In the event of an affirmative reply, the program operation passes over to the element 223. When $YR_2$ is other than zero, an element 222 decides to take the location of $YR_2$ as a second-rank cut. As a rule, such cut coincides with the sheet edge. The same decision is made when program P2N is entered via connection 290.

Having made this decision, the element 223 compares the total cost S(PDR) of the pieces so far placed on the sheet with the total cost stored in the store $S(PDR)_2$. The total S(PDR) relates only to articles which have been placed on the sheet and which are removed therefrom only by a cut having a rank of at most two. If the S(PDR) is greater than the total stored in the store $S(PDR)_2$, an element 224 decides to store the total in the store $S(PDR)_2$ instead of the total previously stored therein. Also, the element 224 delivers to the store MEM second-rank cuts (market Sch 2) corresponding to the total S(PDR) stored in the store $S(PDR)_2$.

Since the example concerns the cutting of a sheet of glass, the element 223 compares only cost price totals. The area of the sheet is not included in the comparison since, as already stated, it is the same for each of the schemes.

In the case of a strip or ribbon, the element 223 is replaced by a first element which relates the cost price total to the total of the area used. This area total is actually the total of the areas of the panels obtained by first-rank cuts. A second element is provided to compare this relationship with the relationship stored in the store $S(PDR)_2$. In the case of such a modified procedure, the element 117 of the program P1 also adds the area of each new, primary panel to the total of the areas of the previously determined primary panels. This operation is not performed in the programs P2 to PN.

Returning now to the program for a sheet, after the best scheme for second-rank cuts has been stored, or after it has been found that the total S(PDR) of the scheme is lower than the total stored in the store $S(PDR)_2$, an arithmetic element 225 performs a first operation to eliminate from the scheme the last piece placed. The element 225 subtracts the cost PDR(I) of that piece from the total S(PDR) and adds one unit to A(I), the number of pieces in order-book line I which must still be cut. A logic element 226 checks whether the piece to be eliminated required a first-rank cut CP when it was placed on the sheet of glass.

In the event of an affirmative reply (+), an element 227 performs operations which are the reverse of those performed by the element 225, so as to retain such piece in the scheme. A shift is then made from element 227, via connection 150, to the element 101 of the program P1, which program tries to place a piece in the first-rank panel left unexploited. Operations will then be as hereinbefore described. If, however, such exploitation is impossble, a state of affairs which the element 101 would detect, an immediate shift is made, via line 160, to the partial program P1M which is shown in FIGURE 11*d* and which, through the agency of the elements 121 to 125 and 128 to 131, corresponding to the elements 221 to 225 and 228 to 231 of the program P2M, would proceed to remove the piece requiring such primary cut and to replace it with a piece having a lower value.

If the reply of the element 226 is negative (−), indicating that the piece eliminated from the scheme required only a second-rank cut, element 228 adds the distance along the OY axis of the second-rank cut to $YR_2$ and erases this cut (Eff→CS). Element 229 then checks whether a transverse cut TT was stored for the piece when the same was originally placed in the scheme. This storage is the work of element 215 (not shown) of the program P2, based upon decisions taken by the elements 213 and 214 (not shown) with regard to the manner of cutting. If a transverse cut TT has been stored, the piece is cut in accordance with the alternate way of cutting and without the arrangement of the piece being changed. To this end, there is a shift from element 229 of program P2M to element 216 (not shown) of program P2, via connection 295. This shift can be made only if the comparisons made by the elements 231 and 232 give an appropriate result. The function of the element 231 is to check whether the new, or alternate, way of cutting is not going to lead to a remainder having one dimension smaller than the minimum order-book dimension $YF_{MIN}$, in which case the other dimension must be the smallest possible.

Since this condition must have been respected when the scheme was devised, it is pointless to modify the manner of cutting.

The element 232 only serves to check whether the dimension YFP of the piece along the axis OY is equal to the dimension $YR_2$ along the axis OY of the exploited rectangle. If these dimensions are equal, there is no need to change the manner of cutting since the second way will not give any different result from the first one. This can be confirmed by turning back to FIGURE 2*a* and assuming that the edge *bc* of the piece to be cut is coincident with the sheet edge BC. The two ways of cutting in FIGURE 2*a* for such a piece give the same result. When the piece can be cut in some other way, element 233 removes the piece from the order book, reducing the number of pieces A(I) by 1, and adds the PDR(I) of such piece to the cost total S(PDR).

When any of the elements 229, 231 or 232, gives an inappropriate reply, a shift is made to the element 230, which checks whether the piece eliminated from the scheme had been placed lengthwise when the scheme was being worked out. This latter data item was stored either by the element 209 or by the element 210, both of which form part of the program P2 and which are not shown in the drawings.

If the piece eliminated from the scheme had been placed lengthwise, the operations of program P2M are shifted over by connection 280 to element 206 of program P2. From thsi element the scheme is reconstructed by endeavoring to place the piece transversely. If the element 230 finds that the piece has already been so placed, operations are transferred via connection 270 to element 203 of program P2 to pass to the next order-book line I, there being no need to try to place the piece lengthwise since, when the first scheme was being worked out by the program P2, transverse placing of the piece was considered only when lengthwise placing was found to be impossible, as a result of the operations carried out by elements 205 to 208 (not shown).

Program P1M, shown in FIGURE 11*d*, differs from program P2M in that the element 126 (not shown) which should correspond to the element 226 of the program P2M is replaced by an element 133 which checks whether the piece which is going to be eliminated from the scheme is a piece from the last order-book line $I_{LIN}$ and whether such piece was placed originally on the glass sheet. In the event of an affirmative response, element 134 proceeds to print (IMPR) the best scheme SCH found, which is recorded in the stores MEM by the elements 124 to N24 of the partial programs P1M to PNM.

The only modification of the program PNM in comparison with the program P2M is the deletion of an element corresponding to 232 which, like the element 232, should check whether the piece to be removed has been placed lengthwise. Transverse placing of such article would lead to a cut of rank (N+1) which must be excluded.

The preparation of the most advantageous cutting scheme by the complete program as hereinbefore described can be interrupted at any time so that, instead of the best scheme, the best scheme obtained before interruption can be used, for only the best cuts for each rank are stored and so can be immediately delivered from the memory store by simple read-out of the store MEM.

We claim:

1. A method for cutting sheets or strips of material into a number of pieces of predetermined dimensions listed in an order book, comprising the steps of:

detecting the coordinates of any flaws present in each sheet or strip;

allocating to each piece of predetermined dimensions to be produced a numerical value representing the cost price of the piece;

establishing sheet or strip cutting patterns taking account of the flaws present, by developing various arrangements on the strip or sheet of the pieces of predetermined dimensions taken from at least a part of the order book;

selecting and retaining that cutting pattern for which the ratio between the sum of the numerical values representing the cost prices of the pieces appearing in the pattern and the total sheet or strip area utilized is a maximum; and cutting the sheet or strip in accordance with at least a part of the selected cutting pattern.

2. A method as defined in claim 1 wherein the numerical value representing the cost price to be allocated to a piece is determined on the basis of the marginal cost price of a selected piece having analogous dimensions.

3. A method as defined in claim 1 wherein the numerical value representing the cost price to be attributed to a piece is represented by the formula $(n(S^{1+\epsilon})+A)$, where S represents the area of the piece, $\epsilon$ is a factor which is a function of the geometric cutting yield of the sheet or strip, $n$ is the cost price of a piece of unit area, and A is a constant the value of which depends upon the cutting conditions.

4. A method as defined in claim 1 comprising the step of modifying the numerical value representing the cost price of a piece as a function of the degree of urgency with which the piece must be cut, an increase in the degree of urgency involving an increase in the numerical value representing the cost price.

5. A method as defined in claim 1 comprising the step of modifying the numerical value representing the cost price of a piece as a function of the variations in time in the normal cutting of the pieces of different size formats present in the order book.

6. A method as defined in claim 1 comprising the step of modifying the numerical value representing the cost price of each piece as a function of the variation of the density of flaws present in the sheets or strip to be cut, an increase in this density resulting in an increase in the numerical value allocated to large pieces and a decrease in the numerical value allocated to small pieces.

7. A method as defined in claim 1 wherein the numerical value representing the cost price of a piece is a function of the order of selection of the pieces to be produced, high values being allocated to high orders of selection.

8. A method as defined in claim 1 comprising the further steps of: supplying cut pieces to a limited number of handling units each intended to receive certain pieces and each arranged at the head of a respective line containing a succession of further handling units; removing each handling unit after it has received its associated pieces and advancing the next succeeding handling unit in the line to the head thereof for receiving its associated pieces; and modifying the numerical values of pieces to be supplied to the units of a particular line to compensate for deviations in the rate of supplying pieces to such units from the rate desired, this being accomplished by increasing the numerical values of pieces destined for units in a line whose rate of advance is slower than desired.

References Cited

UNITED STATES PATENTS

| | | | |
|---|---|---|---|
| 3,191,857 | 6/1965 | Galey et al. | 83—71 X |
| 3,329,181 | 4/1967 | Buss et al. | 143—47 |

JAMES M. MEISTER, Primary Examiner

U.S. Cl. X.R.

83—13, 371